Figure 1:
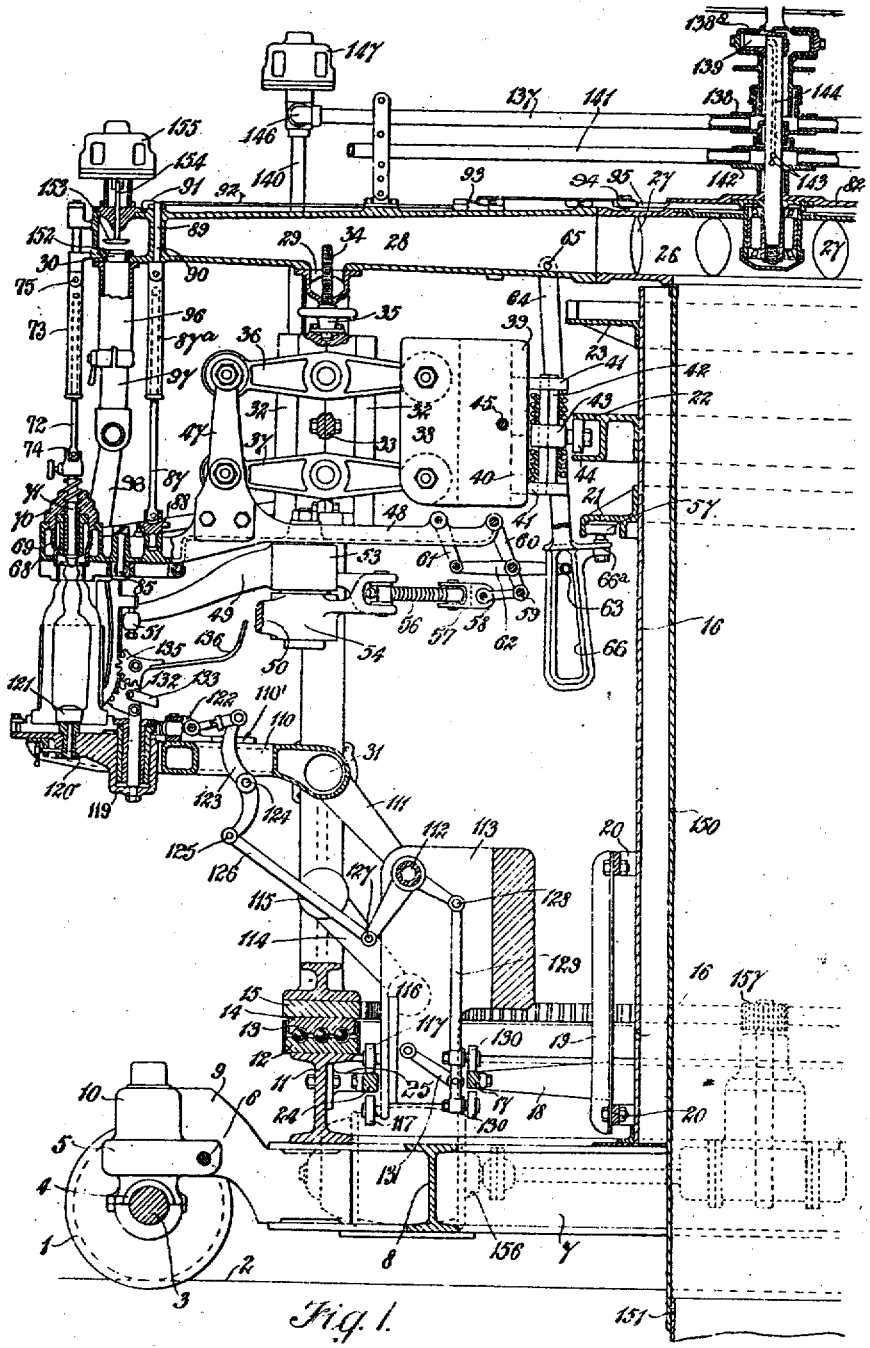
Figure 1:
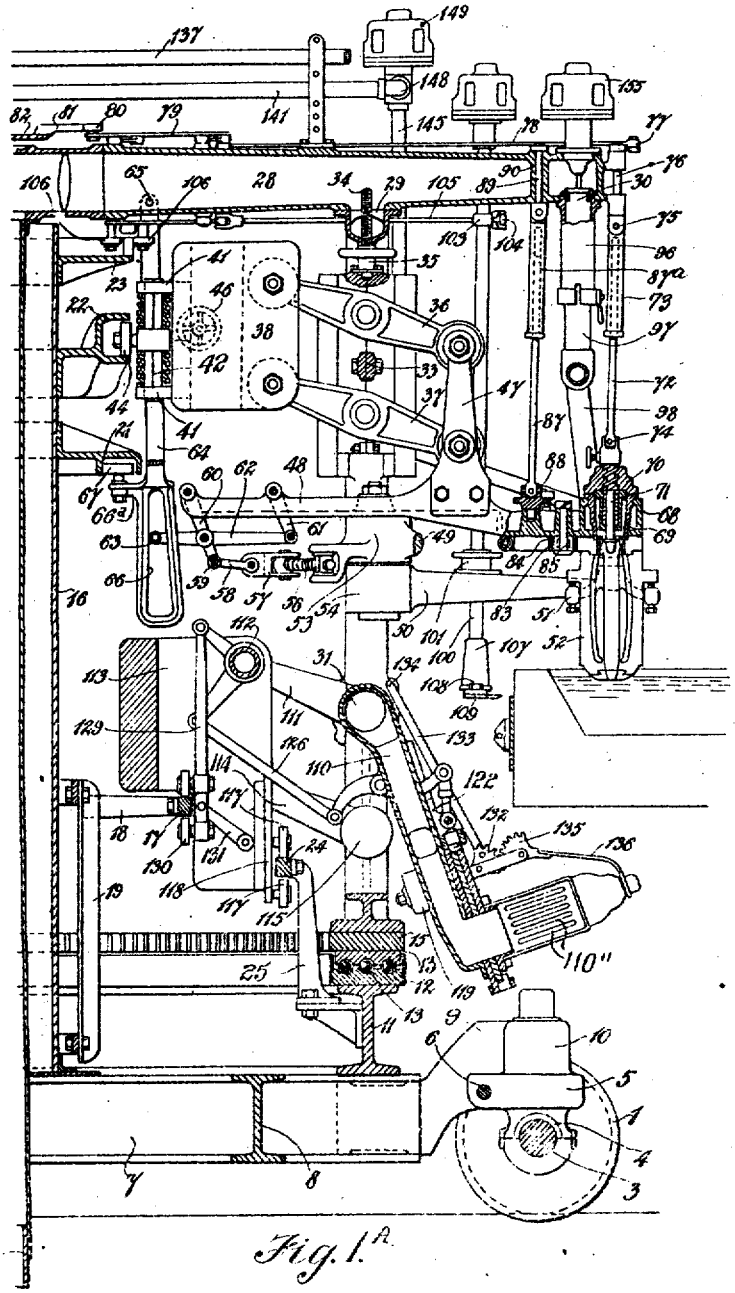

July 1, 1924.

R. F. HALL

MACHINE FOR THE MANUFACTURE OF GLASS ARTICLES

Original Filed March 13, 1918   5 Sheets-Sheet 1

Inventor:
R. F. Hall
By his attorneys,
Baldwin Wight

July 1, 1924.  
R. F. HALL  
1,499,522  
MACHINE FOR THE MANUFACTURE OF GLASS ARTICLES  
Original Filed March 13, 1918  5 Sheets-Sheet 2

Inventor:-
R. F. Hall
By his attorneys

July 1, 1924.
1,499,522
R. F. HALL
MACHINE FOR THE MANUFACTURE OF GLASS ARTICLES
Original Filed March 13, 1918    5 Sheets-Sheet 3
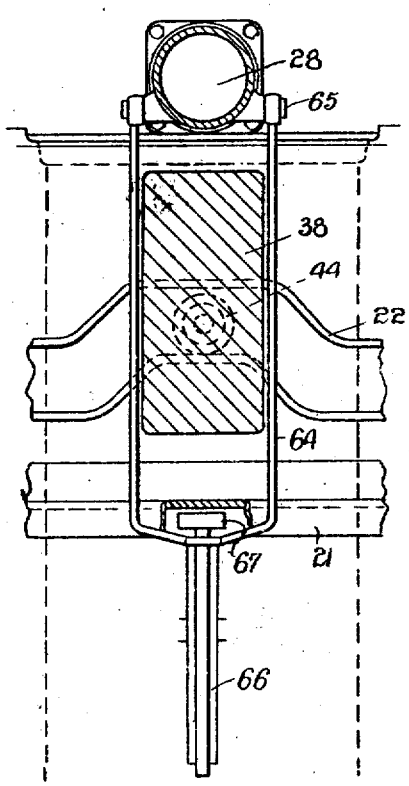
Fig. 1.E
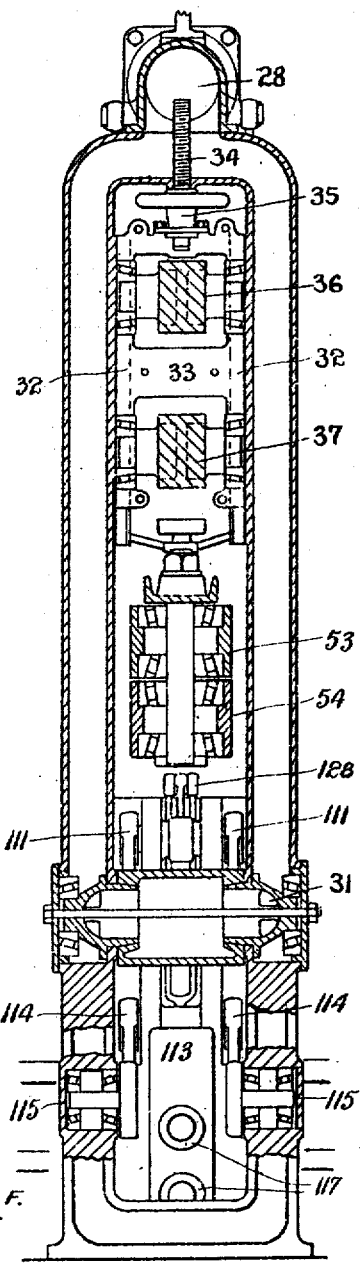
Fig. 1.F

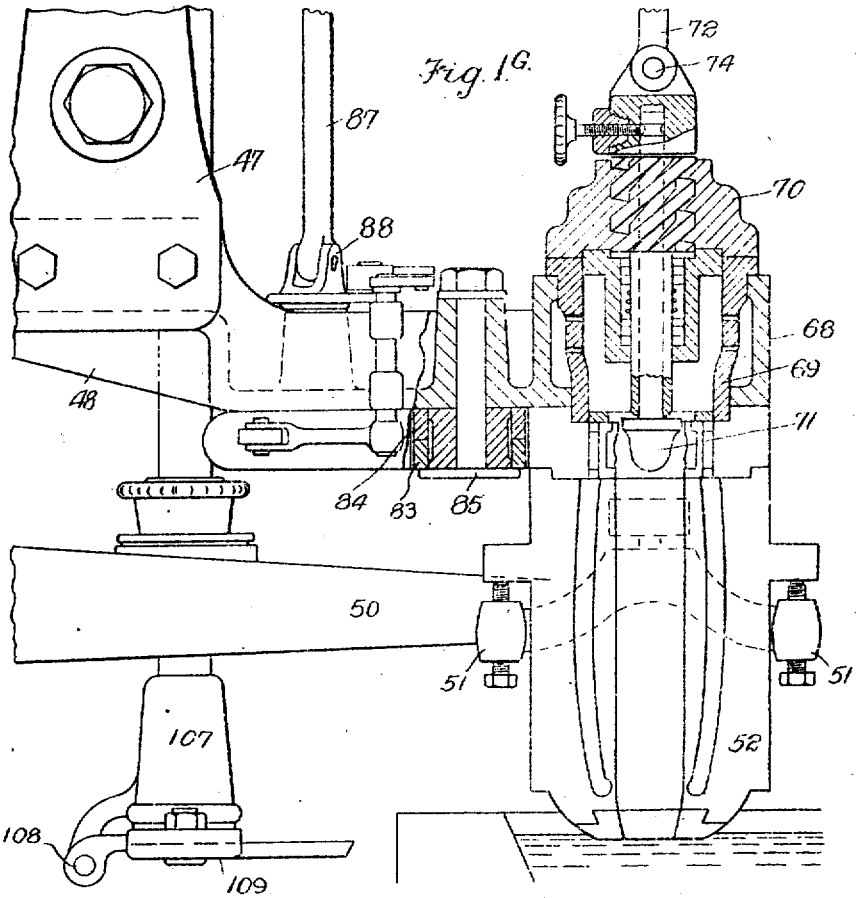
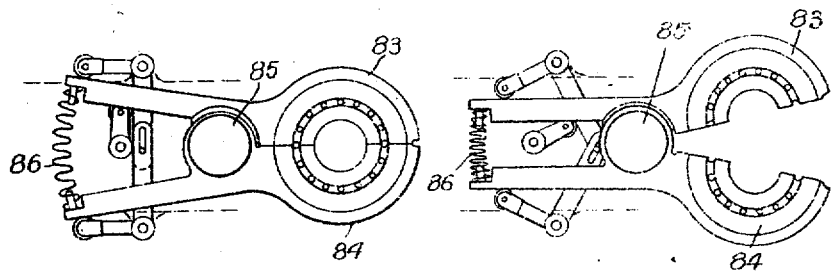

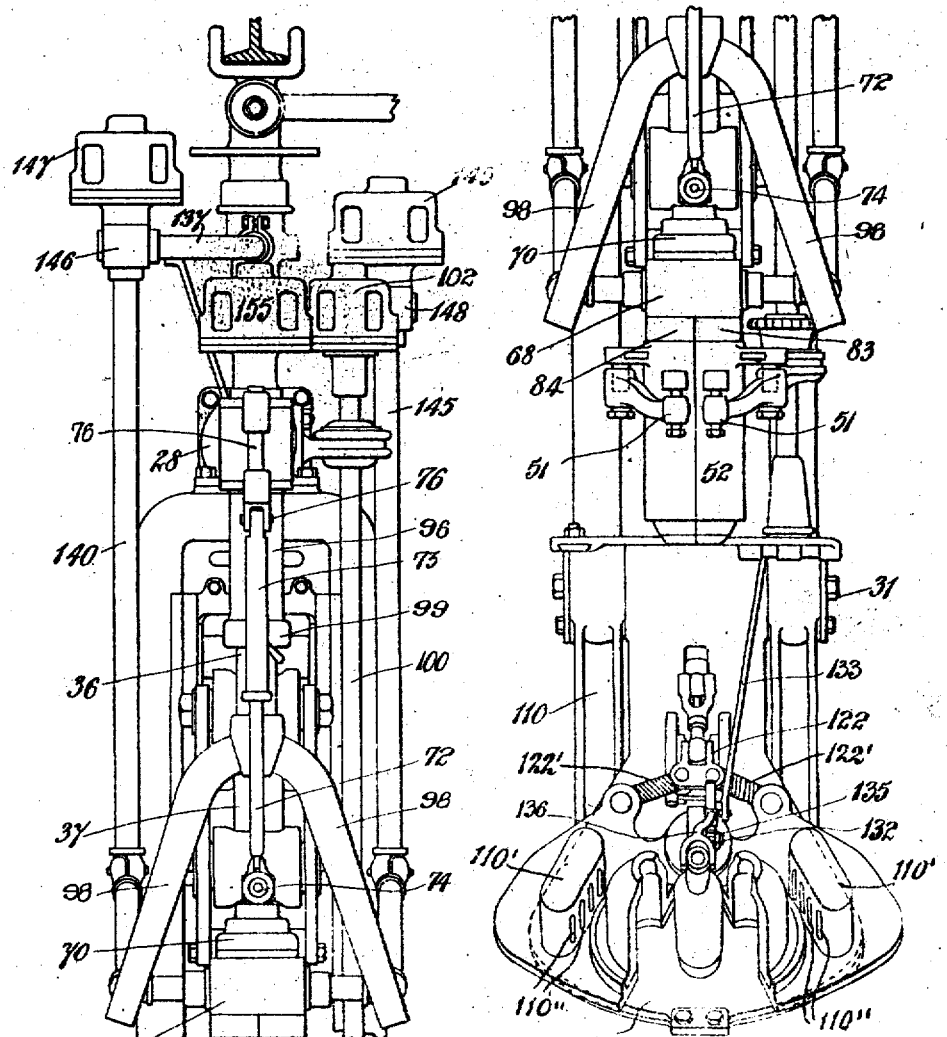

Patented July 1, 1924.

1,499,522

UNITED STATES PATENT OFFICE.

ROBERT FREDERICK HALL, OF MOSELEY, NEAR BIRMINGHAM, ENGLAND.

MACHINE FOR THE MANUFACTURE OF GLASS ARTICLES.

Original application filed March 13, 1918, Serial No. 222,257. Divided and this application filed July 27, 1920. Serial No. 399,427.

(GRANTED UNDER THE PROVISIONS OF THE ACT OF MARCH 3, 1921, 41 STAT. L., 1313.)

*To all whom it may concern:*

Be it known that I, ROBERT FREDERICK HALL, a subject of the King of Great Britain and Ireland, residing at Moseley, near Birmingham, in the county of Warwick, England, have invented certain new and useful Improvements in Machines for the Manufacture of Glass Articles, (for which I have filed an application in Great Britain, No. 9921, filed July 10, 1917), of which the following is a specification.

This application is a division of my application for patent Serial No. 222,257, filed March 13, 1918.

This invention relates to rotary machines for the manufacture of glass articles and refers to that type of such machines in which the molten glass from which the articles are to be formed is drawn by means of suction into a parison or other mould, the said mould being open at the bottom and being lowered to the surface of the molten glass, to enable the glass to be drawn into the interior thereof, after which the mould is raised and the parison therein contained is carried through the various operations necessary for the production of the finished article.

In rotary machines of the foregoing type, it has already been proposed to mount, on a framework or spider a series of parison moulds, the frame being reciprocated vertically during its revolution, to dip the lower edge of each parison mould into the molten glass.

It has also been proposed to provide a principal rotating framework or spider in which are mounted a number of frames each carrying a parison mould and its auxiliary parts, to provide means for adjusting the height of each frame above the glass tank and to counterbalance each frame and the auxiliary parts by means of a suitable weight, each such frame being lowered and raised vertically, while the machine continuously rotates, by a lever connected wih it and co-operating with a horizontal cam disc.

One of the principal objects of the present invention is to improve the construction of the main rotating framework of the machine, with a view to enabling the cooling air to be conducted in a more satisfactory manner to the various moulds or other parts which it is desired to cool.

Other objects of the invention will also be referred to in the specification, as regards minor constructional details and arrangements, and pointed out in the claims.

In order to facilitate the understanding of the invention a machine embodying its chief features and adapted for the manufacture of bottles will now be described by way of example, with reference to the accompanying drawings.

Fig. 1 is a sectional elevation of one-half of the machine, the plane of section being broadly speaking diametrical with respect to the framework and the associated mechanisms.

Fig. 1ᴬ is a similar view, on the same diameter, of the other half of the machine.

Fig. 1ᴱ is a transverse section showing the method of attaching the arm 64 to the arm 28.

Fig. 1ᶠ is a transverse section through one of the bifurcated columns.

Fig. 1ᴳ is an enlarged view of one of the parison moulds and the adjacent parts thereof.

Figs. 1ᴴ and 1ᴶ are views shewing the ring mould in its closed and open positions respectively.

Figs. 1ᴷ and 1ᴸ are segmental views which taken together constitute an outside elevation of the mechanism supporting the finishing mould.

The machine is supported upon wheels 1, adapted to run upon rails 2, in the neighbourhood of the furnace, in the ordinary manner.

These wheels are arranged in pairs, the wheels of each pair being connected by axles 3, 4, are saddle bearings for the axles 3, and each of these saddle bearings 4 is provided with a screw threaded stem, which passes up vertically through a housing or casing 5, within which is mounted, so as to be rotatable but not axially movable, a nut meshing with the screw threaded stem in connection with the bearings 4. This nut is formed on the outside as a worm wheel, and with this worm wheel meshes a worm on the spindle 6. A similar arrangement, but with an oppositely directed thread to the worm is provided in connection with the wheel transversely opposite, on the other side of the machine, the same worm spindle operating the worm wheels of both nuts. In this way, by rotating the spindle 6, each nut is caused to rotate, and as it is unable to move axially it causes the housing 5 to be raised or lowered with respect to the running wheel 1. Means are provided for disengaging the worm at either end of the spindle from its corresponding worm wheel, so that, when required, each of the wheels 1, at the ends of the machine can be adjusted, with respect to the frame, independently of the other, but as a general rule, the whole frame is raised or lowered at one end by simply rotating the spindle 6.

Where desired the entire machine may be raised with respect to the four running wheels 1. To effect this on each of the spindles 6, at each end of the machine, there is provided a worm wheel and a rod or spindle extending longitudinally with respect to the machine is also provided, such spindle being furnished with worms meshing with the worm wheel, so that by rotating this longitudinal spindle by hand or power, the two transverse spindles 6 at each end of the machine are simultaneously rotated, thus raising or depressing the four housings or casings 5 with respect to the level on which the wheels 1 are running.

The main lower framework of the machine is composed of longitudinal H-section girders 7 connected by transverse girders 8. The ends of the longitudinal girders 7 have suitably bolted or otherwise attached thereto brackets or extensions 9 terminating in sleeves 10 embracing the screw threaded rods carried by the saddle bearings 4.

Supported upon the lower framework constituted by the members 7 and 8 is a circular girder 11 the support being effected at three points, about equi-distant from one another, so that any ordinary strains cannot be transmitted from the lower framework to the ring and distort the latter.

The ring girder 11 in turn carries a channelled ring 12 provided with three grooves for the reception of balls 13.

14 is a similar channelled ring forming the upper member of the ball bearing and to this latter is attached an internally toothed annulus, 15.

Suitably supported upon the lower girder framework 7, 8 is a vertical column 16, carrying the principal non-rotatable parts of the machine.

These parts comprise—a large cam 17 carried by brackets 18 connected in turn to vertical struts 19, carried by brackets 20 upon the column 16—another cam, in this case a horizontal cam 21, at a higher level—a vertical cam 22 at a still higher level—and a horizontal cam 23 near the top of the column. 24 is another cam carried by suitable brackets 25 from the lower circular H-girder ring 11.

At the top of the machine, but in the case of the particular construction under consideration, not supported by the column 16, is a chamber 26 provided on the outside with a number of projecting faces each having a circular aperture 27 formed therein.

Bolted to each of the faces of the chamber 26 opposite one of the apertures 27 is a hollow arm 28 which extends radially from the said chamber and which, when bolted in position, forms a part of the chamber, but which may be removed therefrom without difficulty. This radial arm is circular in cross section and closed at the end but provided with apertures 29 and 30 for the purposes hereafter described.

Bolted between each one of the radial arms 28 and the annulus 15 is a column or framework, hereinafter termed "the bifurcated column," and it will be seen that when all the bifurcated columns are in position they carry the chamber 26 through the intervention of the radial arms 28 and that the whole rotatable superstructure of the machine is carried by the bearing ring 14, and further that owing to the great number of balls which can be employed, exceedingly smooth and easy running is obtained as will be hereafter more fully explained.

The mechanisms carried by each of the bifurcated columns and the construction of the columns themselves will now be more fully considered.

The columns are formed from castings of H section at the lower part and solid up to the height of the trunnions 31, from which position to the top, they are hollow, so that when each unit is in position, the interior of the side frames of the columns is in communication through the corresponding arm 28 and aperture 27 with the interior of the chamber 26.

The inner surfaces of the upper portions of the bifurcated columns are machined with plain parallel portions, between which is carried an adjustable framework now about to be described.

This framework consists of two parallel sides members 32, adapted to be held in position as hereafter described. These side members are connected by transverse members 33, and the upper member has secured thereto, a screw threaded rod 34, upon which works a nut 35, provided with an operating hand wheel, the nut being so mounted that it is not axially movable, so that by rotating the said nut by means of the hand wheel the framework constituted by the members 32, 33, can be raised and lowered for the purposes of adjustment.

Pivoted to the framework, 32, 33 by means of suitable bearings are levers, of the first order, 36 and 37.

Suitably pivoted to the inner ends of the levers 36, 37 is a weight 38. This weight is provided at the inner edge 39 with a receptive slideway machined in this part, within which slideway is slidably mounted a strip 40 carrying at its ends two projecting lugs or the like 41, connected by a bar 42. 43 is a ring slidable on the rod 42, carrying the cam roller 44.

Between the lugs 41 and the ring 43 are mounted helical compression springs as will be clearly seen from the drawing.

In order to lock the strip 40 in the required position in the channel 39, the edges of the weight 38 are made so that they can be drawn or clamped together at 39 by means of a screw 45 operated by a hand wheel 46.

Pivoted to the outer ends of the levers 36, 37 are links 47, the construction being such that the levers 36, 37 constitute with the weight 38 and the links 47, a parallel link lever mechanism for the purposes hereinafter explained.

Suitably bolted to the links 47 is a casting 48, carrying the blowing head, the ring mould, the parison mould and associated parts.

The arms 49, 50 of the parison mould carriers 51 (to which the parison moulds 52 are attached in the ordinary well known manner so that the moulds can be easily interchanged) are carried by suitable bearings 53, 54 on the underside of the casting 48.

The castings forming the arms are provided with extensions connected by toggle links of a known description to a spring buffered push rod 56, connected to a fork 57 in turn connected by a pivoted link 58 to the end 59 of a link or lever 60. 61 is another similar link or lever, and both the levers 60 and 61 and the lever 62 form a parallel link motion in conjunction with the portion of the casting 48 between the pivots.

The lever 62 is extended and forked, or two levers 62 may be provided between which are carried a roller 63. 64 is a large depending lever formed as a fork, the upper ends of the tines being pivoted at 65 to the corresponding radial arm 28. This fork is so formed that it embraces the lugs 41 and associated parts but does not come into contact with the same, thus allowing such parts to slide vertically without interference.

The tines of the fork are connected to or formed with a common lower portion 66 provided with a downwardly and outwardly tapering slot, as shown, for the purposes hereinafter mentioned.

The lower portion also carries or is cast with a projection 66ª to which is attached the stem of the cam roller 67, the bearing of such roller being so constructed that it allows the roller 67 to accommodate itself to the path of the cam 21.

The outer end of the casting 48 is formed with a chamber 68 which constitutes the casing of the blowing head and to which the inlet nozzle for compressed air and the suction nozzle are attached as hereafter explained. Within the casing 68 is a bushing or sleeve 69, perforations being provided to allow compression or suction to take place through the walls of this bushing. Mounted at the top of the part 69 is a cap 70. 71 is a plunger for making the initial blow-opening in the top of the parison and the stem of this plunger is carried up through a fitting which is provided with a screw of sudden pitch, corresponding with a similar thread on a rotatable member in connection with the rod rod 72. This rod, which is square at its upper end fits into a square tube 73, with respect to which it can telescope. The rod 72 is pivotally connected at 74, to the fitting controlling the plunger 71, and the tube 73 is pivoted at 75 to a rod 76 journalled in bearings at the outer end of the corresponding arm 28. To the upper end of the rod 76 is keyed a lever to the outer end of which is pivoted at 77 a rod 78 which is controlled through a parallel link motion 79 (mounted at the top of the said arm) from a cam roller 80 operated by a fixed cam 18 upon a non-rotatable fitting 82 located above the machine.

It may be remarked in passing that the object of this arrangement is to give the rod 72 a partial motion of rotation which being transmitted to the screw threaded member associated with the corresponding screw threaded part in connection with the plunger 71, gives the latter an axial movement at the proper time, so that it is brought into contact with and withdrawn from the top of the parison.

Mounted below the blowing head and carried by the casting 48 is the ring mould. This comprises two parts 83 and 84 pivoted at 85 to the lower face of the casting 48, a spring (not shown) being provided for causing the members 84 and 83 to be pulled upwards into close proximity with the underside of the head.

The members 83 and 84 are formed with the usual beaded half rings adapted to mould the neck of the bottle at the top and these half rings are kept normally closed together by means of a helical compression spring 86.

For opening the ring mould when required, the following mechanism is provided. 87 is a rod pivotally connected to a fitting 88, which latter fitting has a part passing through a casting 48 and operating a crank arm carrying a roller.

Pivoted to the underside of the casting 48 are two bell crank levers, provided with rollers operating the ends of the parts 83 and 84 and pushing them inwards when the crank member in connection with the rod 87 is brought against the arm of one of the bell crank levers, the arms of the two bell crank levers being interconnected by a suitable slotted connection (Figs. 1ᴿ and 1ᴶ.)

The rod 87 is square at its upper portion and telescopes into a squared tube 87ª pivotally connected to a rod 89 which passes through suitable sleeve bearings 90 in the coresponding arm 28.

The upper end of the rod 89 has keyed thereto a lever 91 which is pivoted to a rod 92 in connection with the parallel link motion 93, at the top of the said arm operated by a rod and cam roller 94, from a fixed cam 95, and also connected with the fixed plate 82, to which reference has already been made.

The object of this arrangement is to enable the parts of the ring mould to be separated at the proper time in order to release the neck of the bottle, the opening being effected from the cam through the rod 87, and the parts returning under the pull or push of the helical spring 86 as soon as the cam permits.

96 is a tube for cool air extending downwardly from the end of each arm 28 from the aperture 30. This tube has sliding therein another tube 97 which is provided with two forked portions 98 extending downwards and coming on each side of the head. The part 97 is held in position with respect to the tube 96 by screw clamping means 99.

The constructional elements carried by the frames 32, 33 having been described in detail it will be convenient to consider the method of adjusting the frame and the correlated parts with respect to the bifurcated unit within which it is located.

This adjustment has reference to the length of the parison mould which it is desired to employ and has no reference to the operation of the machine, as the frame 32 33 when fixed in position is for the time being in rigid connection with the corresponding bifurcated column.

In order to enable the frame to be secured in position the inner surfaces of each bifurcated column are provided as previously stated, with flat machined faces, upon which are bolted two gib pieces forming a V recess. The gib pieces are permanently bolted upon the inner side, but on the front portion the gib pieces are removable, so that when they are slightly released the frame and the parts which it carries can be raised or lowered, the removable pieces being afterwards screwed up tight.

It will thus be seen that in order to adjust the vertical position of the parison mould and its associated parts, the gib pieces have to be loosened and the hand wheel 46 has to be rotated so as to loosen the parts 39 of the weight 38.

The hand wheel operating the nut 35 is now rotated in the proper direction, raising or lowering the frame 32, 33, as may be required, after which the gib pieces are tightened or locked in position and the screw 45 is screwed up by the hand wheel 46.

In some cases it may be necessary to loosen the screw 99, when it is desired to adjust the cooling tubes 98, where there is considerable variation in the length of the mould.

It will be seen that in this way the strip 40 has been kept in the correct position with respect to the weight 38 whilst owing to the telescopic connections in the tubes 73 and 88, these parts have automatically accommodated themselves to the new setting of the machine. The knift which is about to be described is also so mounted that it does not interfere with the adjustment of the parts.

100 is a tube which passes through a suitable bearing 101, at the side of the arm 28. This bearing is so formed that it admits of a rocking or universal motion. A bearing of the "Skefko" type is suitable for the purpose.

103 is a sleeve slidable on the tube 100, a feather and feather way being provided for casing the tube 100 to rotate with the sleeve 103. Keyed to the sleeve is an arm 104 pivoted to a rod 105 controlled by cam rollers 106 in connection with the double acting cam 23.

The rod 100 passes down through a similar rocking bearing, located upon a lug on one of the arms carrying the parison mould, and is provided at the bottom with a sleeve 107 carrying a downwardly turned plate to which is hinged at 108 an arm 109 having the knife attached thereto at the end.

Passing down the tube 100 is a rod which is provided at the top in the neighbourhood of the solenoid 102, with a magnetizable core, and the construction is such that when current is passed, the rod presses down the knife to a small extent and removes it from contact with the bottom of the parison mould.

The constructional details in connection with the lower portions of each of the bifurcated columns will now be considered.

Each of these columns is formed at 31 with bearings in which work the trunnions of the frame or device carrying the finishing mould and its associated parts.

This consists of a casting 110 formed with suitable passages for air, in connection, through the trunnions and the bearings 31 at the proper time with the hollow passages in the sides of the bifurcated columns. This casting is formed with an extension 111, in such a way that the parts 110 and 111 form a bent lever. The part 111 is pivoted at 112 to a weight 113. 114 is a link pivoted at 115 to the bifurcated column and at 116 to the weight.

It will thus be seen that the part 110 constitutes a swinging table controlled by a parallel link motion from the weight 113.

The weight 113 is itself controlled from the double-acting cam ring 24 through rollers 117, which are attached to a rod 118 connected through spring buffering means to the weight 113.

Mounted upon the swinging table 110 is a plate 110′ provided with suitable slots 110″ for the passage of air. The air passes down the column 201, through the hollow trunnion 31, the hollow table 110, the plate 110′ and out through the slots 110″. 119 is a socket in which the bearing for the two halves if the finishing mold carrier is located.

120 is a socket for the reception of the stem of the bottom mould 121.

The opening and closing of the finishing moulds, which are of ordinary description, is effected in the following manner.

Each of the arms carrying the half of the finishing mould is extended backwards beyond the bearing and the ends of the arms are connected to linking rods which are in turn connected to a slide block 122, a helical compression spring 122′ surrounding each of the rods. The block is connected to an S-shaped lever 123, pivoted at 124 to the swinging member 110. The S-shaped lever 123 is connected at 125 to a link 126 which is pivoted at 127 to one arm of a bell crank lever working freely upon the pivot 112. The other arm of this bell crank lever is pivoted at 128 to a vertical rod 129 carrying rollers 130 working in connection with the double-acting cam 17. 131 is another link pivoted to the rod 129 in order to steady the action and convert it into a parallel link motion the other pivotal point of the link 131 being on the weight 113, as will be clearly seen from the drawing.

132 is a toothed quadrant pivoted above the swinging table 110. This toothed quadrant is connected by means of a rod 133 with a fixed pivotal point 134 on the column 201. 135 is another toothed quadrant carrying a forked arm 136 for the purpose of engaging the neck of the bottle as hereafter explained.

The arrangements in connection with the top of the machine where the distributing systems for compressed air and suction are located, will now be briefly considered.

137 are radiating pipes communicating with sockets in sleeves 138 mounted on a housing rotating in communication with a fixed air tight housing 138ª to the interior of which blowing air is supplied through the conduit 139. The pipes 137 communicate with vertical pipes 140 which pass down to the bifurcated columns, one pipe for each column such pipe being carried out through suitable joints to the nozzle or connection at the side of the blowing head 68. 141 are other radiating pipes communicating with sockets 142 in a rotatable member which is in connection through perforations 143 in the tube 144 with the suction pump. The tubes 141 are connected to vertical tubes 145 which in turn are connected one for each bifurcated column through suitable jointed connections with another nozzle on the suction head 68. At the junction of the pipes 137 and 140 are provided valve chambers 146 containing valves operated by solenoids 147 and in a similar way valves are provided in connection with the valve chambers 148 at the junction of the pipes 141 and 145, the valves being controlled by means of solenoids 149.

The non-rotatable portions of the head, including the cam plate 82 are suitably anchored and prevented from rotating by a fixed attachment to some convenient portion of the building.

150 is a large vertical tube hanging from the chamber 26 and passing down through the central column to the bottom of the machine. Telescopically arranged with respect to the tube 150 is another tube 151, in connection with the source of supply of cooling air. In the preferred construction the fan or blower is carried from a cradle or the like hanging from the bottom of the machine, the means of suspension extending down between the rails upon which the machine is carried.

At the end of each of the radial arms is provided a valve chamber or seating 152, with which co-operates a valve 153 the stem 154 of which is controlled by a solenoid 155.

The driving mechanism for operating the continuous rotation of the machine consists of an electric motor 156 connected by any usual system of shafting and gearing with a pinion 157 which meshes with the internally toothed annulus 15, upon which the rotatable portions of the machine are carried.

Appropriate contact-making means are provided in connection with a source of electrical energy for supplying current at the proper times to the various solenoids operating the valve and other electrically operated parts.

The general operation of a machine of the foregoing description will be briefly considered although such operation is in many respects similar to that of machines already in use and well known to those connected with the glass making industry.

In the first place the appropriate parison moulds are placed in position and the necessary adjustments are effected. For the adjustment of each unit the slide 32, 33 of that particular unit is raised or lowered and fixed in position as already described, and it is pointed out that owing to the peculiar shape of the slot in the part 66, the operation of opening and closing the parison mould at all elevations of the slide is satisfactorily effected.

In order to effect the accurate adjustment of the lower levels of all the parison moulds to the same horizontal plane a gauge is preferably provided, adapted to rest upon the rails and to be brought up to the machine and provision is made for enabling the parison moulds to be closed at a position diametrically opposite to the dipping position, or in some other appropriate position the cam ring being cut away or suitably shaped for this purpose.

The special adjustment of the moulds and the general adjustment by raising and lowering the main frame with respect to the wheels 1, having been effected as originally described, the operation of the machine may commence.

At the right hand side of Fig. 1 in the drawing the parison mould 52 has just been lowered owing to the levers 36 and 37 being rocked over through the medium of the double-acting vertical cam 22, the motion being transmitted as will be readily understood through the roller 44, the sleeve 43, the springs embracing the rod 42, the lugs 41, the strip 40, the weight 38, the levers 35, 37, the link 47 and the casting 48.

It may here be remarked that in the preferred case the weight 38 is heavier than the parts which it counterbalances so that the cam 22 raises the weight when the heads and associated parts are to be lowered.

Assuming that the parison moulds have been lowered as shown in Fig. 1ª, the suction valve is opened by means of the solenoid 149, which caused suction to be produced through the head 68 and around the plug 71, drawing up the molten glass from the tank into the parison mould.

At the same time it is to be observed that the valve 152 over the aperture 30 is closed so that no cooling air can pass down the tubes 97 and 98 and blow upon the glass in the tank.

As soon as the necessary amount of glass has been drawn into the parison mould 52, the said mould is raised, as the cam 22 is so shaped that it then allows the weight to overcome the downward pull of the counterbalanced portions.

The operating rods for the plunger, the ring mould and the knife do not interfere in any way with the free arcing movement of the head and the associated parts owing to the fact that telescoping and jointed connections are provided.

As the head passes away and before it has cleared the tank but after the mould is above the level of the edge thereof, the cam 23 causes the rod 105 to be operated through the cam rollers 106 causing the operating tube 100 for the knife to be rotated through a suitable angle to cut off the glass, the knife remaining for a time under the parison mould and supporting and holding the glass at the bottom thereof.

As the unit passes away, the valve 153 is opened and the cooling air passing up the central pipes 151, 150 the chamber 26 the arm 28, through the aperture 30 passes down through the pipes 96, and 97, to the forked pipes 98 from which it passes through suitable slots or nozzles thus cooling the head, the parison moulds and associated parts, and this valve is not again closed until the particular unit is about to come over the molten glass again.

The plunger 71 is now moved up through the operation of the rod 78 through the cam 81, as previously described, leaving the top of the parison with the preliminary blow opening; a slight preliminary blowing then being effected if desired.

The parison moulds have now risen to their upper position and are ready to be opened, and about this time the solenoid 102, is energized causing the rod extending down the tube 100 to push down the arm carrying the knife 109 for a very short distance against the pull of the spring holding it against the bottom of the parison mould, so that the knife is removed from contact with the bottom of the parison, and it is then swung out of the way by the operation of the rod 105 from the cam 23.

The parison moulds are now opened which is effected from the cam 21, which draws in the roller 67, swinging in the frame 64 causing the roller 63 and the link 62 to be pulled inwards, see the left hand side of Fig. 1, and thus opening the parison moulds through the link 58, the fork 57 and the toggle mechanism and associated parts 56, 55 etc., the arms 49 and 50 swinging apart and separating the halves of the moulds sufficiently to allow for the subsequent rise of the finishing moulds into position.

The raising of the finishing moulds is effected by the weight 113, which is preferably heavier than the parts which it has to counterbalance, so that when the cam 24 permits of the descent of the weight, the halves of the finishing mould rise into position.

At the same time, or at the suitable time, the halves of the mould are closed together by the double-acting cam 17, but it is particularly to be observed that with the construction which has been described and illustrated, the opening and closing of the finishing mould is not necessarily affected by the rise and fall of the moulds, that is by their swinging with respect to the axis 31.

When the halves of the mould are in the closed position they are kept in this position by the springs before referred to in connection with the toggle mechanism.

The finishing mould being closed, the bottle is blown, the valve for the blowing air being opened through the solenoid 147 being energized.

When the blowing is finished, and the valve is closed, the ring mould is opened by the rotation through a suitable angular distance of the rod 87, which operation is effected through the rod 92, by the cam 93 in the manner already indicated.

The cam 24 now overcomes the counterbalance weight 113 which has previously been causing the finishing mould to retain its correct position in relation to the lower surface of the ring mould. The weight 113 is raised and the finishing mould sinks down into the position shown on the right hand side of Figure 1 as regards its vertical height, but it is of course to be understood that this sinking down actually takes place at some suitable position on the other side of the machine.

It is to be remembered that cooling air is passing from the arm 28 down the outside of the bifurcated column through hollow trunnions 31 and the hollow casting 110 to suitable slots and apertures so that cooling air is blown around the finishing mould.

The casting 110 travels round with the halves of the mould closed together, and in the case of the machine under consideration they remain closed until the unit has passed the glass tank and a new parison has been drawn into the corresponding parison mould.

Before considering the opening of the mould, it is to be pointed out that when the mould descended, this caused the rod 133 to pull upon the pivoted quadrant 132, which in turn rocked over the quadrant 135 and caused the fork 136 to engage around the neck of the bottle as seen in Fig. 1^A.

Just before or just as the mould is to be again raised, the cam 18, acting through the rollers 17, causes the bell crank lever mechanism 113, 114 and the levers 126, 125, etc., to cause the toggle mechanism to open the halves of the mould.

The fork 136 prevents the bottle from sticking to either half of the mould and the bottle drops away into the usual shoot as the finishing mould rises to enclose a fresh parison.

The cycle of operations is carried on continuously in the same manner as just described.

The liberal dimensions of the framework of the machine built up from the bifurcated columns enables access to be obtained to the inner parts without difficulty.

The telescopic joints in connection with the tubes 73, 88 and 96 also enables the machine to adapt itself automatically to variations in position of the frame or casting 48 and its associated parts.

In some cases in addition to the large ball bearing ring upon which the framework rotates, ball bearings may be provided at the top of the central column and between such column and the casting forming the chamber 26.

The overhead stationary air supply pipes may in some cases be carried centrally through a main cooling air supply duct and be fixed or anchored below the floor level of the machine, should it be found more convenient for constructional reasons or to suit local conditions.

The vertical tubes may be concentric with each other and may serve the purpose of supplying the vacuum and blowing air, the supply in such case coming from below instead of above.

In some cases where it is not required to utilize electric solenoids, I prefer to arrange that the operation of raising and lowering the moulds, opening and closing the same and controlling all the valves, in fact the control of all the operating parts is effected by means of cams.

I claim:

1. A machine for forming glass articles comprising a stationary frame, a rotatable frame on said stationary frame, said rotatable frame comprising a central member having hollow radially extending arms thereon, a column connected to each arm and having air ducts therein communicating with the hollow arms, a blow head, a parison mold and a finishing mold and their associated parts carried by each column, means for conducting cooling air from the ducts in the columns to the finishing molds, means for supplying cooling air to the radial arms, means for supplying blowing air and suction to the blow head, and means for operating the parison mold, finishing mold and blow head.

2. A machine for forming glass articles comprising a stationary frame, a rotatable frame on said stationary frame, said rotatable frame comprising a central member having hollow radially extending arms thereon, a column connected to each arm and having air ducts therein communicating with the hollow arms, a blow head, a parison mold and a finishing mold and their associated parts carried by each column, means for blowing cooling air from the hollow columns to the parison molds, means for conducting cooling air from the ducts in the columns to the finishing molds, means for supplying cooling air to the radial arms, means for supplying blowing air and suction to the blow head, and means for operating the parison mold, finishing mold and blow head.

3. A machine for forming glass articles comprising a relatively stationary frame member, a rotatable frame mounted thereon, which frame includes a hollow central column, an upper member having hollow radially extending arms on the upper end of the central column, and arranged in such manner that air may pass from the central column to the arms, downwardly extending hollow columns on the radially extending arms, an annular member connecting the lower portions of the depending columns, glass article forming units in the rotatable frame, and means for supplying cooling air to the article forming members from the hollow columns.

4. A machine for forming glass articles comprising a relatively stationary frame member, a rotatable frame mounted thereon, which frame includes a hollow central column, an upper member having hollow radially extending arms on the upper end of the central column, and arranged in such manner that air may pass from the central column to the arms, downwardly extending hollow columns on the radially extending arms, an annular member connecting the lower portions of the depending columns, bearings on the relatively stationary frame for said annular member, glass article forming units in the rotatable frame, and means for supplying cooling air to the article forming members from the hollow columns.

5. A machine for the manufacture of glass articles comprising a stationary frame, a rotatable frame thereon, said rotatable frame including a central column, hollow arms radiating from the upper portions of said central column, vertical columns connected with the radial arms, a parison mold and a finishing mold and their associated parts carried by each of the vertical columns, said parison molds and finishing molds being arranged for vertical movement, and means for supplying the parison molds with cooling air from the radial arms comprising telescoping tubes connected with the arms and having forked lower ends which terminate in proximity to the parison molds.

6. A machine for the manufacture of glass articles comprising a stationary frame, a rotatable frame thereon, said rotatable frame including a central column, hollow arms radiating from the upper portions of said central column, hollow vertical columns connected with the radial arms, a parison mold and a finishing mold and their associated parts carried by each of the vertical columns, said parison molds and finishing molds being arranged for vertical movement, means for supplying cooling air from the hollow vertical columns to the finishing molds, and means for supplying the parison molds with cooling air from the radial arms comprising telescoping tubes connected with the arms and having forked lower ends which terminate in proximity to the parison molds.

7. A machine for the manufacture of glass articles comprising a stationary frame, a rotatable frame thereon, said rotatable frame including a central column, hollow arms radiating from the upper portions of said central column, vertical columns connected with the radial arms, a parison mold and a finishing mold and their associated parts carried by each of the vertical columns, said parison molds and finishing molds being arranged for vertical movement, means for supplying the parison molds with cooling air from the radial arms comprising telescoping tubes connected with the arms and having forked lower ends which terminate in proximity to the parison molds, a valve for each of the telescoping tubes arranged to shut off the cooling air thereto when the respective parison mold for each tube is in dipping position, and means for actuating the valve.

8. In a machine for the manufacture of glass articles, the combination of a fixed base, a ring rigidly connected to the said base, the said ring forming the lower member of an anti-friction bearing, another ring rotatable with respect to the first mentioned ring and forming the upper member of the anti-friction bearing, hollow columns mounted upon the second mentioned ring, hollow radial arms in connection with the said hollow column, such radial arms being also connected to an air supply, and hollow lever mechanisms carrying finishing molds, mounted upon hollow trunnions so that the interior of such lever mechanisms is in communication with the hollow columns.

9. In a machine for the manufacture of glass articles, the combination of a fixed base, a ring mounted rigidly upon the said base, the said ring forming a lower member of an anti-friction bearing, another ring rotatable with respect to the first mentioned ring and forming the upper member of the anti-friction bearing, a hollow chamber at the center of the upper part of the machine, said hollow chamber being in communication with an air supply, hollow columns mounted upon the second mentioned ring, hollow radial arms connecting the before mentioned chamber to the said hollow columns, lever mechanisms carrying parison and finishing molds pivotally mounted between the said hollow columns, and means for supplying air from the said hollow columns to the parts of the molds to be cooled, for the purposes set forth.

10. In a machine for the manufacture of glass articles, the combination of a fixed base, a ring mounted rigidly upon the said base, the said ring forming a lower member of an anti-friction bearing, another ring rotatable with respect to the first mentioned ring and forming the upper member of the anti-friction bearing, hollow columns mounted upon the second mentioned ring, hollow radial arms in connection with the said hollow columns, such radial arms being also connected to an air supply, mechanisms carrying a parison mold mounted upon the said hollow columns, downwardly extending hollow forks in connection with the hollow radial arms, such forks being provided with apertures to enable cooling air to be supplied to the outside of the molds and parts to be cooled, and means for cutting off the supply of cooling air at appropriate times, substantially as described.

11. In a machine for the manufacture of glass articles, the combination of a fixed base, a ring mounted rigidly upon the said base, the said ring forming the lower member of an anti-friction bearing, another ring rotatable with respect to the first mentioned ring and forming the upper member of the anti-friction bearing, a hollow chamber at the center of the upper part of the machine, said hollow chamber being in connection with an air supply, hollow columns mounted on the second mentioned ring, hollow radial arms connecting the before mentioned chamber to the said hollow columns, lever mechanisms carrying parison and finishing molds, pivotally mounted between the said hollow columns, extensions to the hollow radial arms provided with downwardly turned hollow forks engaging the parison molds and associated parts, and apertures to the said forks for blowing cooling air to the molds and associated parts, with valve mechanism for cutting off the supply of cooling air at appropriate times, substantially as and for the purpose described.

12. In a machine for the manufacture of glass articles, the combination of a fixed base, a ring rigidly connected to the said base, the said ring forming the lower member of an anti-friction bearing, another ring rotatable with respect to the first mentioned ring and forming the upper member of the anti-friction bearing, hollow columns mounted upon the second mentioned ring, hollow radial arms in connection with the said hollow columns, such radial arms being also connected to an air supply, lever mechanisms carrying parison and finishing molds pivoted between the said hollow columns, hollow extensions to the said radial arms provided with downwardly turned portions furnished with hollow forked members, such forked members being provided with apertures coming opposite the molds and parts to be cooled, and means for controlling and stopping the supply of air to the forks, substantially as described.

13. In a machine for the manufacture of glass articles, the combination of an upper rotatable member, a lower rotatable member, and a number of glass article making units, each comprising a hollow elongated loop, the said loop being in communication with a source of air, lever mechanism at an upper level, pivoted to the said loop and carrying a parison mold and its associated parts, lever mechanism at a lower level pivoted to the said elongated loop and carrying a finishing mold and its associated parts, and means for supplying the cooling air from the interior of the elongated loop to the finishing molds and parts to be cooled, substantially as described.

In testimony whereof, I have hereunto subscribed my name.

ROBERT FREDERICK HALL.